US011300199B2

(12) United States Patent
Poster et al.

(10) Patent No.: US 11,300,199 B2
(45) Date of Patent: Apr. 12, 2022

(54) NON-PRESSURIZED ACCESSORY GEARBOX

(71) Applicant: Bell Helicopter Textron Inc., Forth Worth, TX (US)

(72) Inventors: Scott David Poster, Arlington, TX (US); Walter Riley, Fort Worth, TX (US); Gary Cope, Keller, TX (US); Charles Hubert Speller, Jr., Flower Mound, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 738 days.

(21) Appl. No.: 15/709,904

(22) Filed: Sep. 20, 2017

(65) Prior Publication Data

US 2018/0087656 A1 Mar. 29, 2018

Related U.S. Application Data

(60) Provisional application No. 62/423,371, filed on Nov. 17, 2016, provisional application No. 62/399,097, filed on Sep. 23, 2016.

(51) Int. Cl.
*F16H 57/04* (2010.01)
*B64C 27/12* (2006.01)
(Continued)

(52) U.S. Cl.
CPC ......... *F16H 57/0457* (2013.01); *B64C 27/12* (2013.01); *B64D 33/00* (2013.01);
(Continued)

(58) Field of Classification Search
CPC .. F16H 57/0457; F16H 57/0449; F16H 57/02; B64C 27/12; F16N 7/385; F01M 9/108; F01M 9/10
See application file for complete search history.

(56) References Cited

U.S. PATENT DOCUMENTS 3,255,825 A * 6/1966 Mouille ................. B64C 27/12
416/170 R
5,344,101 A * 9/1994 Francois ............... B64C 27/006
184/6.11
(Continued)

FOREIGN PATENT DOCUMENTS

EP 2574546 A1 4/2013
EP 2602515 A1 6/2013
(Continued)

OTHER PUBLICATIONS

Bell Helicopter Textron Inc., "Bell 525 Relentless" Poster, Nov. 12, 2014.
(Continued)

*Primary Examiner* — Philip J Bonzell
(74) *Attorney, Agent, or Firm* — Edwin S. Flores; Daniel J. Chalker; Chalker Flores, LLP

(57) ABSTRACT

A non-pressurized accessory gearbox for an aircraft includes: a housing, one or more gears disposed within the housing, an input rotating member to receive input from a main rotor gearbox via a shaft connected to the one or more gears, and one or more output rotating members in communication with the one or more gears. The gearbox is configured to utilize splash lubrication for moving a lubrication fluid within the housing.

27 Claims, 7 Drawing Sheets

(51) Int. Cl.
B64D 33/00 (2006.01)
F16H 57/02 (2012.01)
(52) U.S. Cl.
CPC ......... *F16H 57/02* (2013.01); *F16H 57/0449* (2013.01); *F16H 2057/02013* (2013.01); *F16H 2057/02034* (2013.01); *F16H 2057/02082* (2013.01)

(56) References Cited

U.S. PATENT DOCUMENTS

| | | | | |
|---|---|---|---|---|
| 8,459,413 | B2* | 6/2013 | Gmirya | B64C 27/12 |
| | | | | 184/6.22 |
| 9,638,107 | B2* | 5/2017 | Abousleiman | F02C 7/36 |
| 9,708,074 | B2* | 7/2017 | Jaenker | B64C 27/12 |
| 10,569,892 | B2* | 2/2020 | Simonetti | B64D 27/02 |
| 10,759,280 | B2* | 9/2020 | Waltner | B60L 50/30 |
| 2006/0266883 | A1 | 11/2006 | Gmirya | |
| 2009/0151494 | A1* | 6/2009 | Cooper | C10M 169/04 |
| | | | | 74/462 |
| 2010/0025159 | A1* | 2/2010 | Gmirya | F01M 11/10 |
| | | | | 184/6.4 |
| 2010/0326085 | A1* | 12/2010 | Veilleux | F01D 1/16 |
| | | | | 60/778 |
| 2014/0127000 | A1* | 5/2014 | Abousleiman | F02C 7/36 |
| | | | | 415/124.1 |
| 2014/0130628 | A1* | 5/2014 | Abousleiman | F16H 57/021 |
| | | | | 74/412 R |
| 2014/0352469 | A1* | 12/2014 | Tanaka | F16H 57/02 |
| | | | | 74/413 |
| 2016/0016670 | A1* | 1/2016 | Sautreuil | B64D 31/14 |
| | | | | 307/9.1 |
| 2016/0083104 | A1* | 3/2016 | Simonetti | B64D 27/02 |
| | | | | 701/3 |
| 2016/0305331 | A1* | 10/2016 | Prunera-Usach | F02C 7/36 |
| 2017/0225573 | A1* | 8/2017 | Waltner | B64D 27/24 |

FOREIGN PATENT DOCUMENTS

| | | |
|---|---|---|
| EP | 3299283 A1 | 3/2018 |
| WO | 2008091341 A2 | 7/2008 |

OTHER PUBLICATIONS

Perry, Dominic, "Analysis: Bell 525 Relentless cutaway and Technical Description" Flight International, Nov. 14, 2014, London, https://www.flightglobal.com/news/articles/analysisbell525relentlesscutawayandtechnical405541/.
European Patent Office, Communication pursuant to Article 94(3) EPC for EP Appl. No. 17192690.0 dated Jan. 25, 2019, 5 pp.
European Patent Office, Communication pursuant to Article 94(3) EPC for EP Appl. No. 17192690.0 dated Mar. 12, 2018, 8 pp.
European Patent Office, Communication pursuant to Article 94(3) EPC for EP Appl. No. 17192690.0 dated Aug. 15, 2018, 5 pp.
European Patent Office, European Search Report for EP Appl. No. 17192690.0 dated Feb. 16, 2018, 4 pp.

* cited by examiner

NON-PRESSURIZED ACCESSORY GEARBOX

CROSS-REFERENCE TO RELATED APPLICATIONS

This patent application claims priority to U.S. provisional patent application Ser. No. 62/399,097 filed on Sep. 23, 2016 entitled "Improved Helicopter Transmission System" and U.S. provisional patent application Ser. No. 62/423,371 filed on Nov. 17, 2016 entitled "Improved Helicopter Transmission System," all of which are hereby incorporated by reference in their entirety.

STATEMENT OF FEDERALLY FUNDED RESEARCH

Not applicable.

TECHNICAL FIELD OF THE INVENTION

The present invention relates in general to the field of gearboxes, and more particularly, to a non-pressurized accessory gearbox that eliminates oil leak paths.

BACKGROUND OF THE INVENTION

Without limiting the scope of the invention, its background is described in connection with rotorcraft drive systems.

Since their inception, rotorcraft and rotorcraft drive systems have been improved to reduce the possibility of failure during flight. Toward that end, a number of modifications have been made to drive systems to improve reliability. However, despite advances in materials and design, a number of failures continue to occur that affect rotorcraft performance. One example of a problem with current rotorcraft drive systems is that, in some instances, the failure of single drive system component leads to failure of the entire drive system. Another example is a loss of lubrication event that causes the loss of torque transmission by drive system subcomponents such as gearboxes or accessories connected to the main rotor gearbox.

More particularly, the failure of a single gearbox or shaft connected to the main rotor gearbox can significantly impact operations. For example, if there is a loss of lubrication to a gearbox, the gearbox loses torque transmission, causing damage to upstream or downstream components. The same can occur when a shaft becomes unbalanced (or breaks), which can damage couplings, gearboxes and even the main rotor gearbox. Unfortunately, when a portion of a drive system experiences a failure or reduction in performance, the concomitant reduction in power leads to challenges with flight performance.

Thus, a need remains for improving the overall safety and reliability of rotorcraft drive systems that include the connections between the engines and the main rotor gearbox, reduction and accessory gearboxes, shafts, generators, oil pumps, and accessories connected to the main rotor gearbox. Specifically, systems and methods that minimize the number of single load path components, provide maximum system separation and redundancy, minimize maintenance required and maintenance related incidents, minimize the potential of loss of lubrication events, and maximize main rotor gearbox loss of lubrication capability are desirable, including systems and methods for cooling components and systems during normal operations and during loss of lubrication events.

Prior art gearboxes typically require external oil coolers and have pressurized oil leak paths. Further, they typically have external grease packed bearings. All of these features are potential failure points and require frequent maintenance and servicing. Systems and methods that reduce or eliminate dependence on such features are desirable.

SUMMARY OF THE INVENTION

In one embodiment, the present invention includes a non-pressurized accessory gearbox for an aircraft comprising: a housing; one or more gears disposed within the housing; an input rotating member to receive input from a main rotor gearbox via a shaft connected to the one or more gears; one or more output rotating members connected to the one or more gears; and wherein the non-pressurized accessory gearbox is configured to utilize splash lubrication for moving a lubrication fluid within the housing. In one aspect, at least one of the one or more gears is a drive gear that includes two output rotating members. In another aspect, the drive gear drives a blower and an electrical generator. In one aspect, at least one of the one or more gears, the input rotating member, or one or more output members are lubricated within the housing. In another aspect, at least one of the one or more output rotating members drive a blower, hydraulic pump, or an electrical generator. In another aspect, the gearbox further comprises an oil level gauge in fluid communication with the lubrication fluid in the housing and positioned to provide an indicium of a level of the lubrication fluid in the housing. In another aspect, the gearbox further comprises an oil level sensor that measures a level of the lubrication fluid in the housing during operation of the gearbox.

In another embodiment, the present invention includes an aircraft, comprising: two or more accessory gearboxes connected to a main rotor gear box, each of the accessory gearboxes comprising: a housing; one or more gears disposed in the housing; an input rotating member to receive input from the main rotor gearbox via a shaft connected to the one or more gears; and one or more output rotating members connected to the one or more gears; and wherein each accessory gearbox is configured to utilize splash lubrication for moving a lubrication fluid within the housing. In one aspect, at least one of the one or more gears is a drive gear that includes two output rotating members. In another aspect, the drive gear drives a blower and an electrical generator. In one aspect, each of the two or more accessory gearboxes is connected to the main rotor gearbox via a shaft. In another aspect, at least one of the one or more gears, the input rotating member, or the first output member is lubricated within the housing. In one aspect, at least one of the one or more output rotating members drive a blower, a hydraulic pump, or an electrical generator. In one aspect, the housing further comprises an oil level gauge in fluid communication with the lubrication fluid and positioned to provide an indicium of a level of the lubrication fluid in the housing when the accessory gearbox is not in operation. In another aspect, the aircraft further comprises an oil level sensor that measures a level of the lubrication fluid in the housing during operation of the gearbox.

In another embodiment, the present invention includes a method of providing redundant accessory functions to a rotorcraft comprising: connecting two or more accessory gearboxes to a main rotor gear box, each of the accessory gearboxes further comprising: a housing; one or more gears disposed within the housing; a lubrication fluid within the housing; one or more output rotating members in communication with the one or more gears; an input rotating member to receive input from a main rotor gearbox via a shaft, wherein the input rotating member is connected to the one or more gears in the housing; and moving the lubrication fluid within the housing using splash lubrication. In one aspect, each of the two or more accessory gearboxes is connected to the main rotor gearbox via a shaft. In another aspect, at least one of the one or more gears, the input rotating member, or the first output member is lubricated within the housing. In another aspect, the housing further comprises an oil level gauge in fluid communication with the lubrication fluid and positioned to provide an indicium of a level of the lubrication fluid in the housing when the accessory gearbox is not in operation. In another aspect, the method further comprises connecting an oil level sensor that measures a level of the lubrication fluid in the housing.

In yet another embodiment, the present invention includes a method of lubricating a non-pressurized accessory gearbox comprising: providing a lubrication fluid to a housing comprising one or more gears; providing an input rotating member to receive input from a main rotor gearbox via a shaft connected to the one or more gears; providing one or more output rotating members connected to the one or more gears; and moving the lubrication fluid within the housing using splash lubrication.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
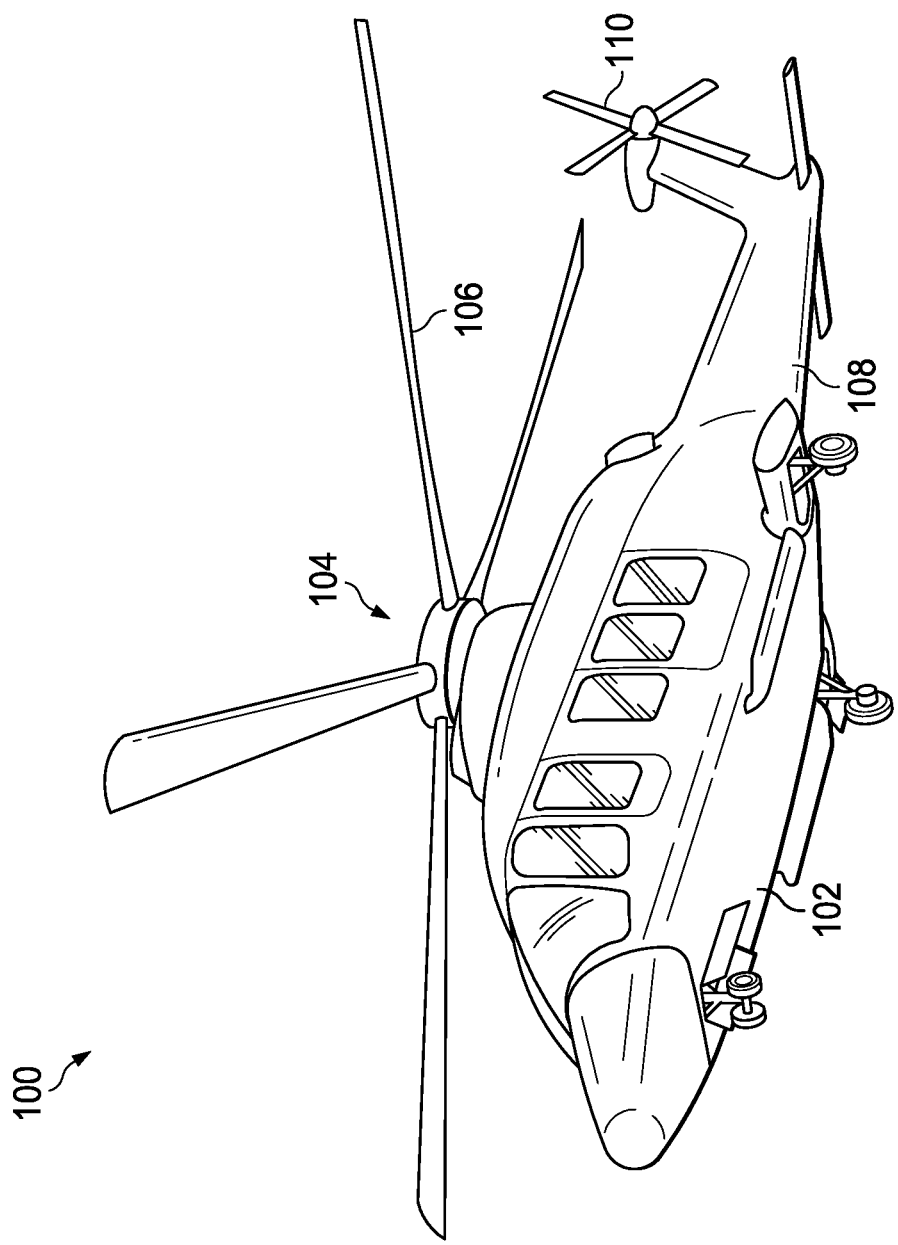
FIG. 1 shows a side view of a helicopter according to a preferred embodiment of the present application.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention addresses the problems with drive systems in use today that are known to lead to rotorcraft failure. More particularly, the drive system of the present invention was designed to overcome drive system failures by including one or more of the following design features: (1) minimize the number of single path drive system components; (2) provide maximum system separation and redundancy; (3) minimize maintenance requirements and maintenance related incidents; (4) minimize the potential of loss of lubrication events; and/or (5) maximize main rotor gearbox loss of lubrication capability. The rotorcraft drive system described herein includes, e.g., dual engine reduction gearboxes completely isolated from the remainder of drive system via freewheeling clutches in the main rotor gearbox, dual accessory gearboxes separate from the main rotor gearbox, and the distribution of the gearbox driven accessories among the separate systems, among other improvements.

The present invention was developed to address the failures common to rotorcraft drive systems and is based on a completely new design and application of new technology to rotorcraft safety. More particularly, the new rotorcraft drive system is focused in an unparalleled manner on safety and redundancy. The goal of safety drove the design and development of the unique layout and configuration of the rotorcraft drive system described herein, which incorporates unique features and system separation that protects primary aircraft systems from the most common drive system failures. The drive system has also been designed to maximize the operational capability in the event of an uncommon failure, such as a loss of lubrication.

Moreover, the present inventors recognized that high-speed gearing and the associated heat generation is always an area of concern for gearbox survivability. The ability to continue torque transmission, particularly in a loss of lubrication scenario, is of great importance. For this reason, the drive system described herein includes two separate reduction gearboxes (RGB's), each one connected to a separate engine and independent from the Main Rotor Gearbox (MRGB). The reduction gearboxes are fully self-contained and separate from each other, each reducing the engine output speed from a high speed at or near turbine engine speed of greater than 10,000 RPM to a speed substantially lower than the high speed, a low speed of less than about 6,000 RPM, prior to transmitting torque to the MRGB. With this drive system arrangement high-speed gearing is contained in separate gearboxes, as such, the survivability of the total drive system is greatly enhanced, particularly in the event of high-speed gear failure or loss of lubricant in an individual RGB.

According to one embodiment, the MRGB has additional unique features including the low speed (less than about 6,000 RPM) input. The use of independent RGBs that connect to a single low speed overhung planetary gear system in the MRGB reduces rotating part count and heat generation. Low gear count is achieved by the use of compound gears that incorporate compartmentalized lubrication recovery elements and one or more independent and monitored chip detectors. With maintenance in mind, the drive system allows for a short mast top case assembly that allows swapping of the top case and mast without removal of the main rotor gearbox from the aircraft. The MRGB also includes a clutch for each input of the reduction gearboxes that allows each reduction gearbox to be separately and independently disconnected from the MRGB.

High-speed gearing and the associated heat generation is always an area of concern for gearbox survivability. The ability to continue torque transmission, particularly in a loss of lubrication scenario is of great importance. For this reason, the present invention includes a powertrain for a rotorcraft that includes two separate engine reduction gearboxes (RGB), e.g., one RGB for each engine of a two-engine rotorcraft. The reduction gearboxes are fully self-contained and separate from each other, reducing the engine output speed from a high speed at or near turbine engine speed of greater than 10,000 RPM to a speed substantially lower than the high speed, e.g., a low speed of less than about 6,000 RPM, prior to transmitting torque to the main rotor gearbox (MRGB). This rotational speed reduction is accomplished with, e.g., a simple three (3)-gear reduction. The rotational reduction can be accomplished with 2, 3, 4, 5, 6 or more gears; however, a 3 gear system provided the requisite reduction. Each RGB has its own self-contained lubrication system consisting of pump, filter, oil monitoring sensors, and a unique core in the aircraft cooler assembly.

With this arrangement, where high-speed gearing is contained in separate gearboxes, the survivability of the total drive system is greatly enhanced, particularly in the event of high speed gear failure or loss of lubricant in an individual RGB. Each reduction gearbox can be disconnected from the MRGB by a clutch.

The Main Rotor Gearbox (MRGB) transmits torque from the Reduction Gearboxes (RGB) to the main rotor mast, the accessory gearboxes, the hydraulic pump and generator that is mounted to the MRGB, and to the tail rotor drive shaft.

The drive system of the present invention can also take advantage of a number of additional features that minimize the possibility of loss of lubricant and to maximize the operational time if a loss of lubricant event does occur. For example, the drive system can also include one or more of the following: (1) the use of transfer tubes for cooler and filter mounting to eliminate the loss of lubricant in the event of loss of attachment fastener torque; (2) using an oil cooler mounted directly to the main rotor gearbox eliminating external hoses; (3) the use of all oil filter bowls are screw-on instead of held-on with small fasteners eliminating fastener failure issue from repeated removals; (4) the elimination of a high speed planetary and the heat generation associated with it during a loss of lubrication event; (5) the use of gear tooth geometry specifically designed to minimize sliding reducing heat generation at the teeth and the tendency to score during a loss of lubrication event; (6) the use of coarse pitch power gears with clearance or backlash allowing for the expansion during high heat loss of lubrication events; (7) the use of high hot hardness material utilized for primary torque carrying components maximizing their continued operation in the event of a loss of lubrication event; (8) the use of ring gear and case joint design to efficiently transmit heat away from the planetary gears in the event of a loss of lubrication event; and/or (9) the use of isotropic super finished gear teeth resulting in a greatly improved surface finish and maximizing the ability of these gears to operate in a reduced lubrication environment.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
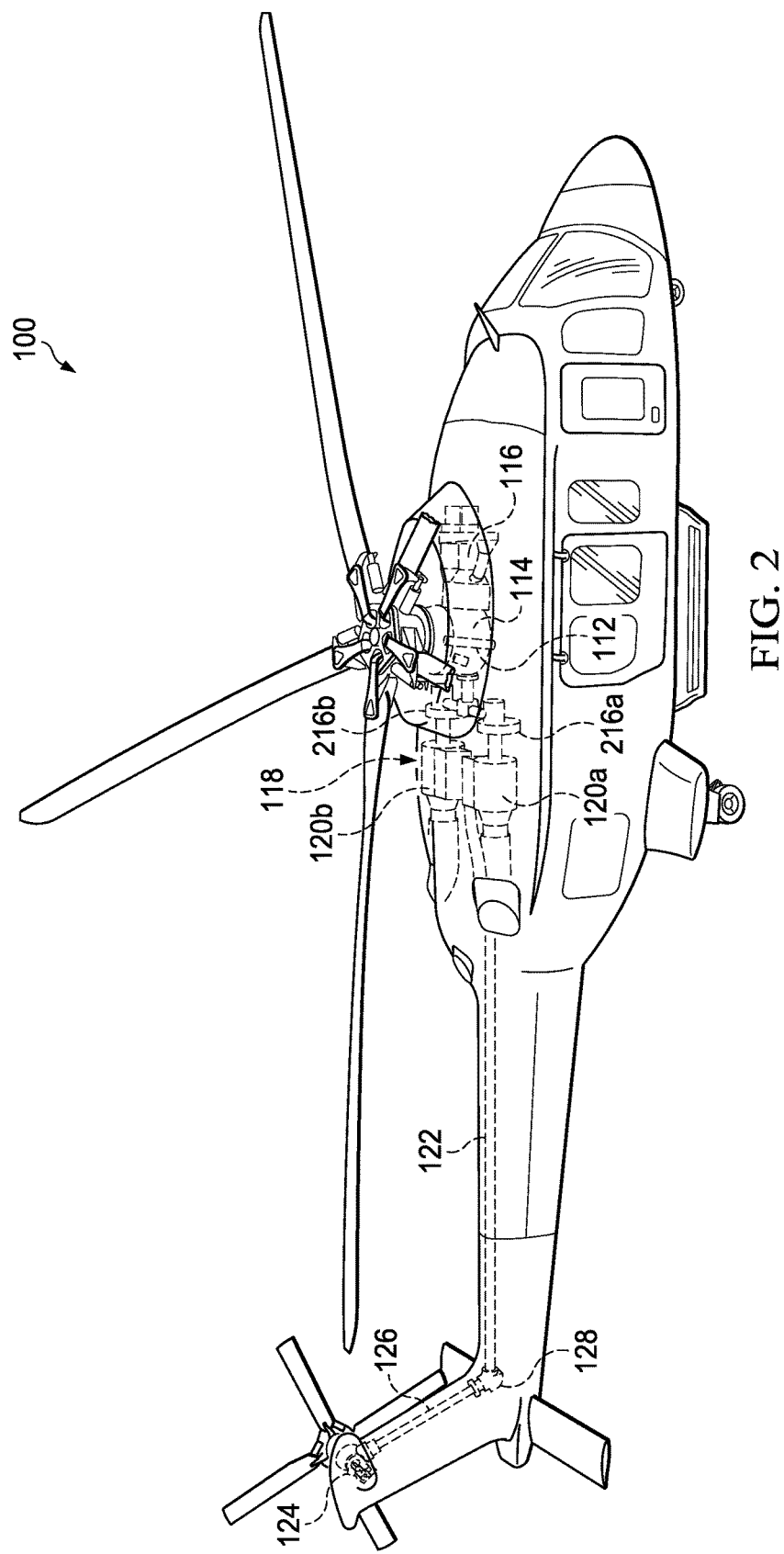
FIG. 2 shows a partial cross-section, perspective view of helicopter aircraft according to an alternative embodiment of the present application.

For example, FIG. 2 shows a partial cross-section perspective view of aircraft 100 that includes additional detail of an embodiment of the present invention. Aircraft 100 further includes a rotor mast 112, which is connected to the main rotor gearbox 114. The main rotor gearbox 114 is connected to one or more accessory gear boxes 116 and one or more reduction gearboxes 216a, 216b. Each reduction gearbox 216a, 216b is connected to one or more engines 120a, 120b, which are within an engine compartment 118. A tail rotor drive shaft 122 transmits mechanical rotation from the main rotor gearbox 114 to the tail rotor gear box 124, which is connected via tail rotor drive shaft 126 and intermediate gear box 128.

Figure 3:
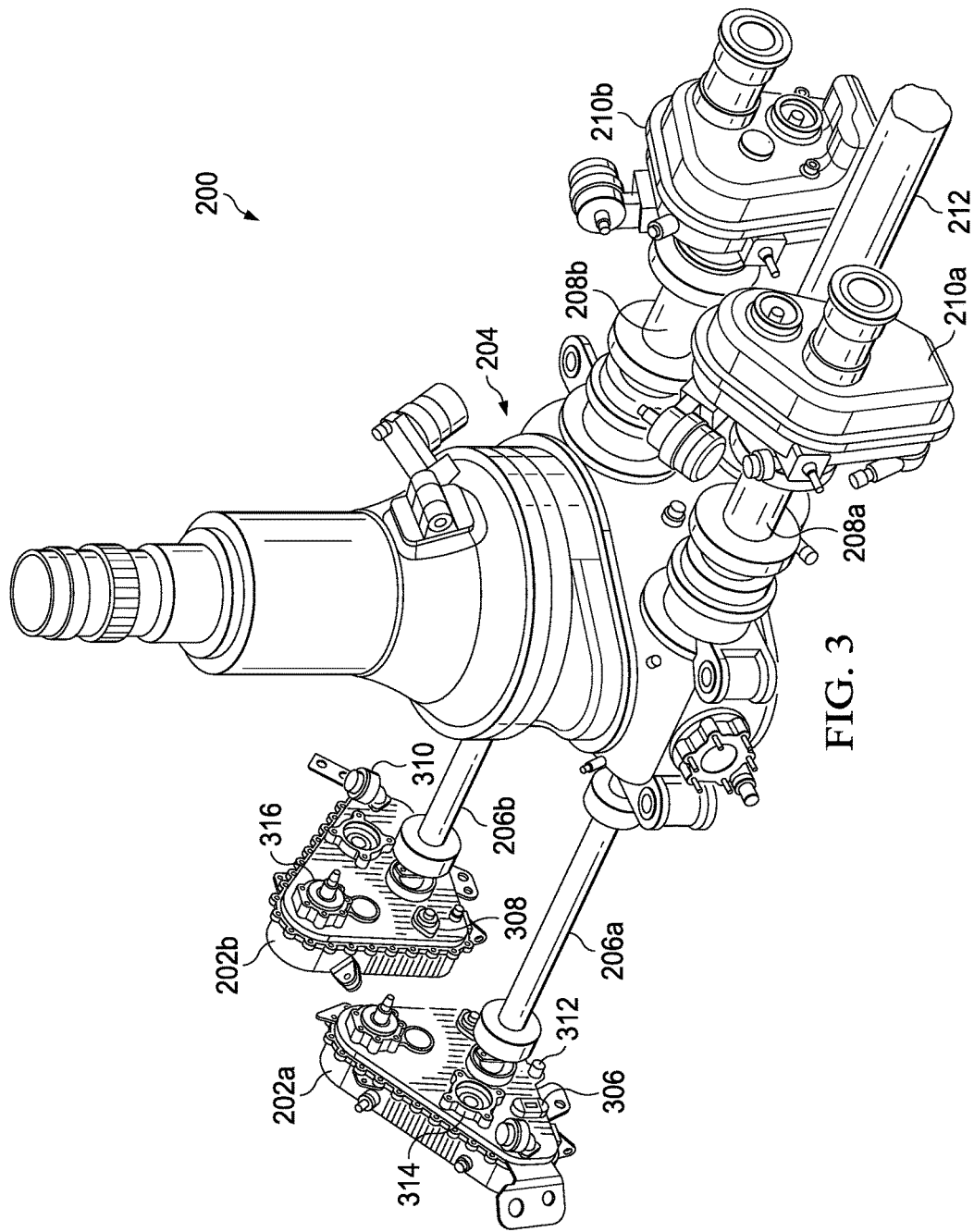
FIG. 3 shows an isometric view of a drive system configuration for use with the present invention that shows the position of two accessory gearboxes of the present invention.

FIG. 3 shows an isometric view of a configuration for a drive system 200 for use with the present invention that shows the position of two accessory gearboxes 202a, 202b of the present invention. The two accessory gearboxes 202a, 202b are each connected to the main rotor gearbox 204 via shafts 206a, 206b, respectively. The main rotor gearbox 204 is connected via shafts 208a, 208b to engine reduction gearboxes 210a, 210b, respectively. The drive system 200 provides independent and redundant power from the engines (not depicted) to the engine reduction gearboxes 210a, 210b, each of which can power the main rotor gearbox 204. Further, the main transmission can independently power two separate and redundant accessory gearboxes 202a, 202b, thereby providing independent, and thus redundant, accessory power to drive electrical, cooling, and other system of an aircraft. Also depicted is the drive shaft 212 that provides rotational power to the tail rotor (not depicted).

Figure 4:
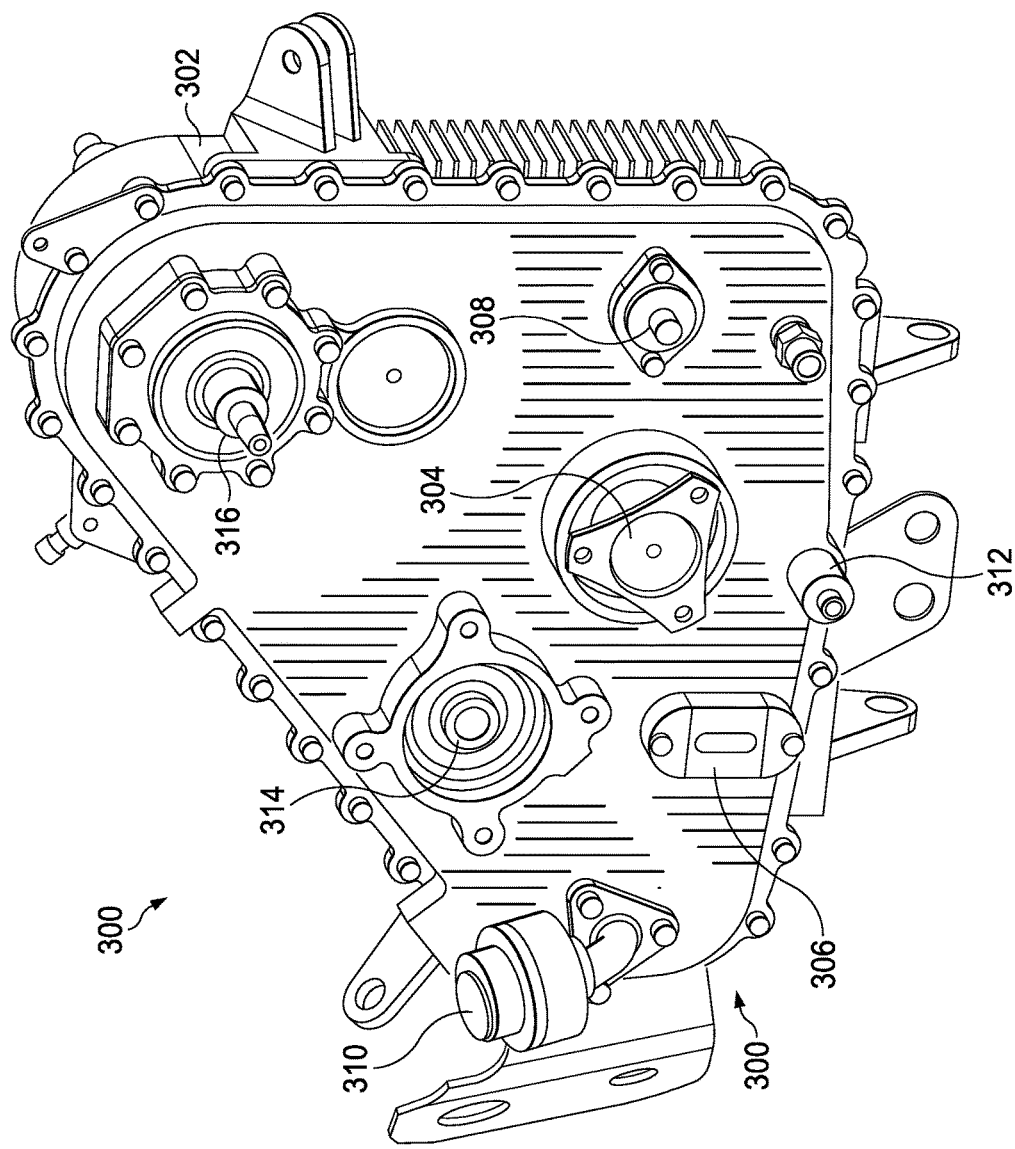
FIG. 4 shows a forward-facing view of the non-pressurized accessory gearbox of the present invention.
Figure 5:
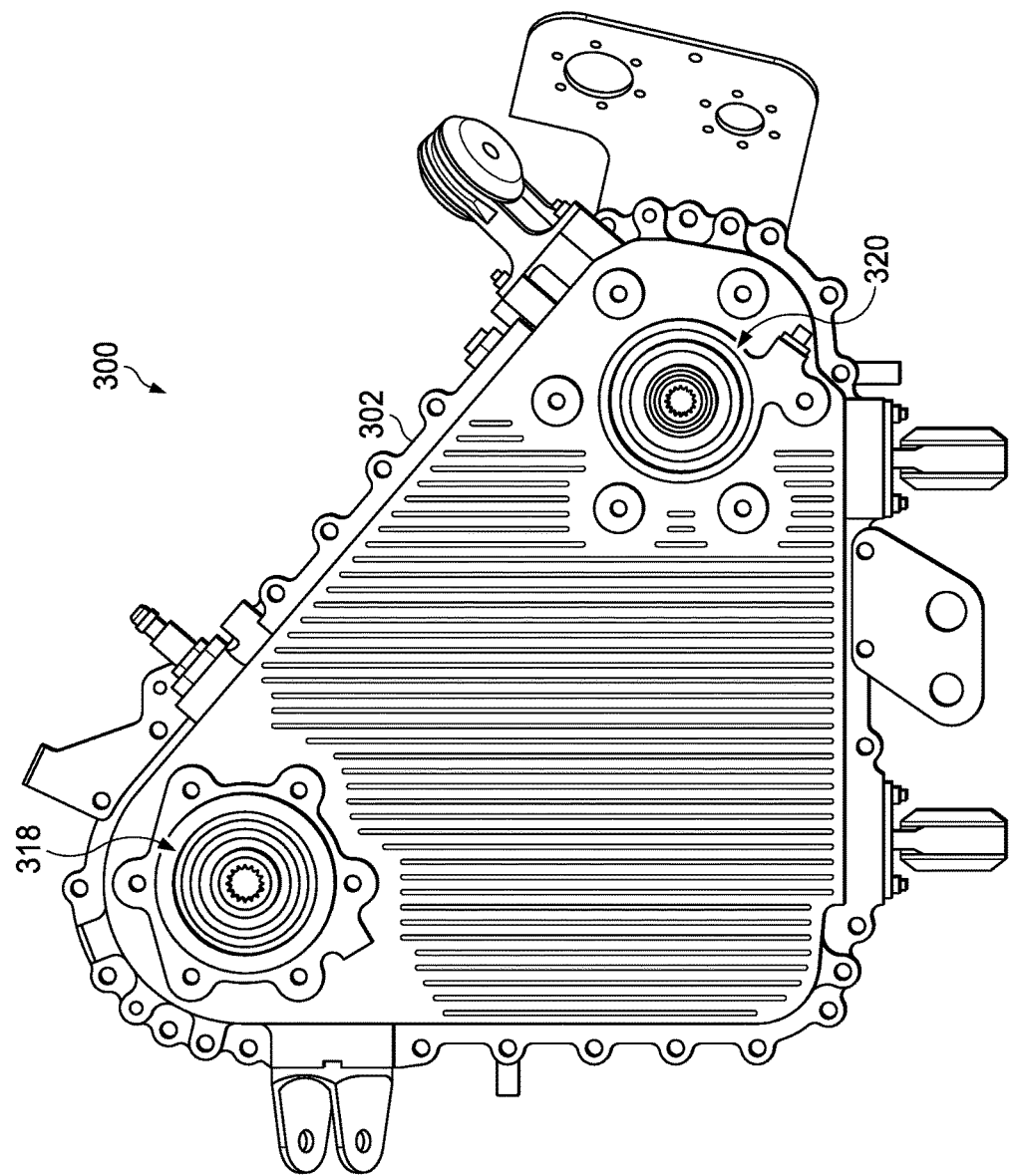
FIG. 5 shows an aft-facing view of the non-pressurized accessory gearbox of the present invention.
Figure 6:
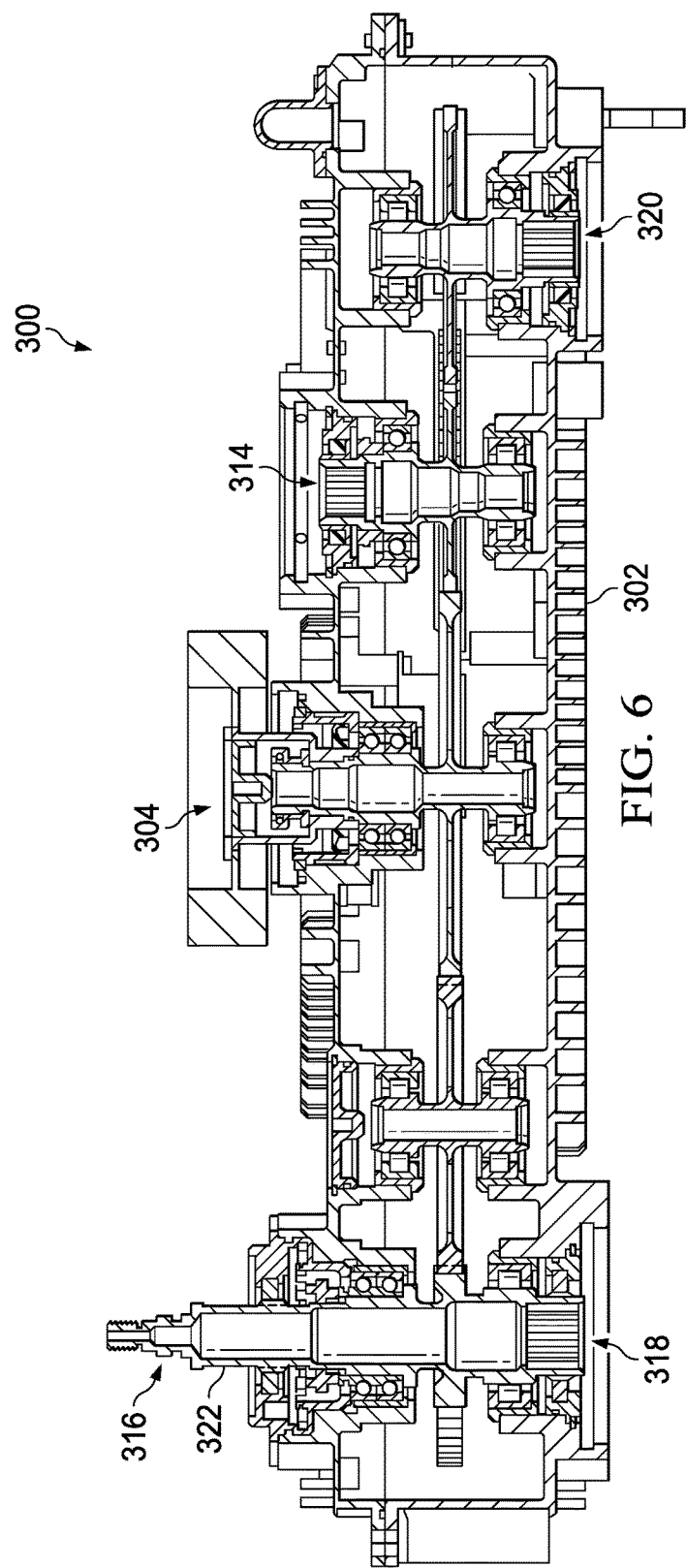
FIG. 6 shows a cross-section view of the non-pressurized accessory gearbox of the present invention.

FIGS. 4 through 6 show the non-pressurized accessory gearbox 300 of the present invention. The non-pressurized accessory gearbox 300 includes a housing and an opening within the housing 302 that connect the gears within non-pressurized accessory gearbox 300 to accept an input from the main rotor gearbox (not depicted), and certain outputs as outlined herein below. The accessory gearbox 300 connects to an output from the main rotor gearbox at main rotor gearbox input 304. Input 304 can be an input rotating member. The accessory gearbox 300 can also include an oil level gauge 306, oil level sensor 308, oil filler cap 310, and/or a sump chip detector 312. The housing 302 can also include various outputs. The outputs can be rotating output members (e.g., blower output 316, permanent magnet generator output 314, primary generator output 318, hydraulic pump output 320, etc.) that drive rotating accessories such as: a permanent magnet generator that generates an electrical output, a blower, primary generator or a hydraulic pump. The gears within the accessory gearbox 300 are sized to provide the necessary speeds and torques required by each accessory. All the internal parts of the accessory gearbox 300 are splash lubricated.

Gear 322 may include two outputs, one on each side of the accessory gearbox 300. One output can power a primary generator; the other can power the blower. In the embodiment of FIGS. 4 through 6, the aft facing portion of gear 322 is output 316 for the blower; the forward facing portion of gear 322 is output 318 for the primary generator.

Briefly, the simple spur gear train drives all accessories, which moving parts are splash lubricated. The accessory gearbox 300 requires no external oil cooler or pressurized oil lines, which has a potential leak path. The accessory gearbox 300 can include a fuzz burning chip detector 312. The accessory gearbox 300 can further be connected directly to, e.g., a blower impeller mounted directly to a protruding gear shaft. By lubricating the various bearings internally, the accessory gearbox 300 has no need for external grease packed bearings. Generally, any protruding portions of the accessory gearbox 300 are corrosion resistant steel for decreased wear and protection from corrosion in this environment.

Figure 7:
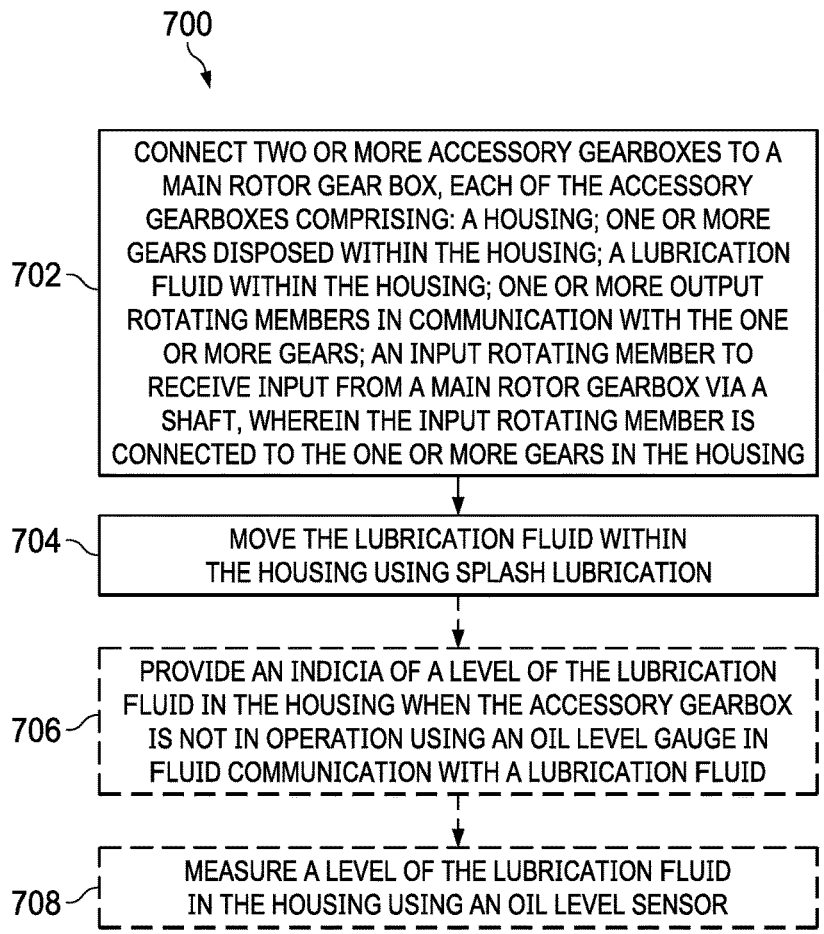
FIG. 7 shows a flow chart of a method of providing redundant accessory function to a rotorcraft of the present invention.

FIG. 7 shows a flow chart of a method 700 of providing redundant accessory function to a rotorcraft of the present invention. Two or more accessory gearboxes are connected to a main rotor gearbox in block 702. Each of the accessory gearboxes includes a housing, one or more gears disposed within the housing, a lubrication fluid within the housing, one or more output rotating members in communication with the one or more gears, and an input rotating member to receive input from a main rotor gearbox via a shaft. The input rotating member is connected to the one or more gears in the housing. The lubrication fluid is moved within the housing using splash lubrication in block 704. Optionally, an indicium of a level of the lubrication fluid in the housing is provided when the accessory gearbox is not in operation using an oil level gauge in fluid communication with a lubrication fluid in block 706. Also optionally, a level of the lubrication fluid in the housing is measured using an oil level sensor in block 708. Note that at least one of the one or more gears can be a drive gear that includes two output rotating members. The drive gear can drive a blower and an electrical generator. In addition, each of the two or more accessory gearboxes can be connected to the main rotor gearbox via a shaft. Moreover, at least one of the one or more gears, the input rotating member, or at least one of the one or more output rotating members can be lubricated within the housing.

Figure 8:
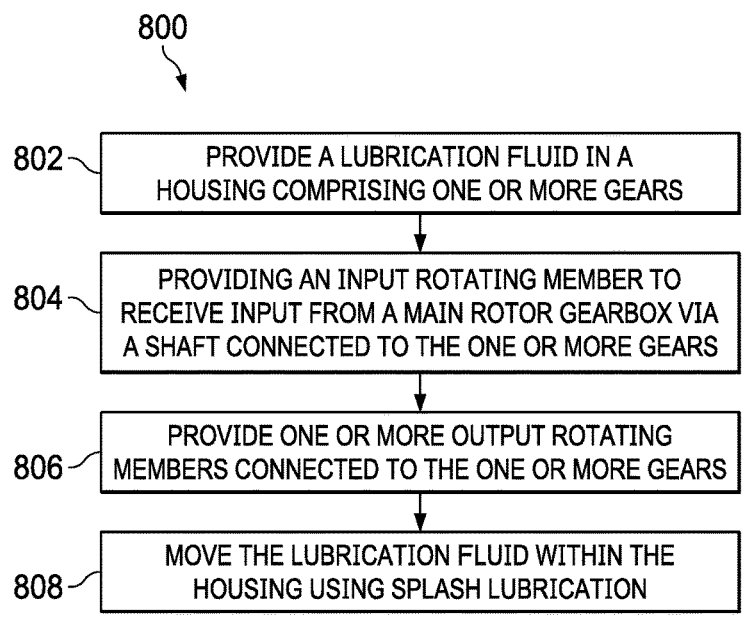
FIG. 8 shows a flow chart of a method of lubricating a non-pressurized accessory gearbox of the present invention.

FIG. 8 shows a flow chart of a method 800 of lubricating a non-pressurized accessory gearbox of the present invention. A lubrication fluid is provided in a housing comprising one or more gears in block 802. An input rotating member is provided to receive input from a main rotor gearbox via a shaft connected to the one or more gears in block 804. One or more output rotating members connected to the one or more gears is provided in block 806. The lubrication fluid is moved within the housing using splash lubrication in block 808.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A non-pressurized accessory gearbox for an aircraft comprising:
   a non-pressurized accessory gearbox housing;
   one or more gears disposed within the non-pressurized accessory gearbox housing;
   an input rotating member connected to the one or more gears and configured to receive input from a main rotor gearbox via a shaft connected to the one or more gears; and
   one or more output rotating members in communication with the one or more gears, wherein the one or more output rotating members are configured to be connected to two or more outputs for a blower, a hydraulic pump, or an electrical generator;
   wherein the non-pressurized accessory gearbox is configured to utilize splash lubrication for moving a lubrication fluid within the non-pressurized accessory gearbox housing, and wherein the non-pressurized accessory gearbox is configured to be connected to the main rotor gearbox; and
   wherein a pressurized oil line for the non-pressurized accessory gearbox is excluded.

2. The non-pressurized accessory gearbox of claim 1, wherein at least one of the one or more gears, the input rotating member, or the one or more output members are lubricated within the non-pressurized accessory gearbox housing.

3. The non-pressurized accessory gearbox of claim 1, wherein the one or more output rotating members are configured to drive the blower, the hydraulic pump, and the electrical generator.

4. The non-pressurized accessory gearbox of claim 1, wherein the non-pressurized accessory gearbox housing further comprises an oil level gauge in fluid communication with the lubrication fluid in the non-pressurized accessory gearbox housing and positioned to provide an indicium of a level of the lubrication fluid in the non-pressurized accessory gearbox housing when the non-pressurized accessory gearbox is not in operation.

5. The non-pressurized accessory gearbox of claim 1, further comprising an oil level sensor that measures a level of the lubrication fluid in the non-pressurized accessory gearbox housing.

6. The non-pressurized accessory gearbox of claim 1, wherein an external oil cooler for the non-pressurized accessory gearbox is excluded.

7. The non-pressurized accessory gearbox of claim 1, wherein external grease-packed bearings for the non-pressurized accessory gearbox are excluded.

8. The non-pressurized accessory gearbox of claim 1, wherein at least one of the one or more gears is a drive gear that includes two of the output rotating members, wherein a first output rotating member of the two output rotating members is a first portion of the drive gear facing in a first direction, and a second output rotating member of the two output rotating members is a second portion facing in a second direction that is opposite to the first direction.

9. The non-pressurized accessory gearbox of claim 8, wherein the drive gear is configured to drive the blower and the electrical generator.

10. An aircraft, comprising:
    a main rotor gearbox;
    two non-pressurized accessory gearboxes configured to be connected to the main rotor gearbox, each of the non-pressurized accessory gearboxes comprising:
      a non-pressurized accessory gearbox housing;
      one or more gears disposed within the non-pressurized accessory gearbox housing;
      an input rotating member connected to the one or more gears and configured to receive input from the main rotor gearbox via a shaft connected to the one or more gears; and
      one or more output rotating members in communication with the one or more gears, wherein the one or more output rotating members are configured to be connected to two or more outputs for a blower, a hydraulic pump, or an electrical generator;
      wherein each of the two accessory gearboxes is configured to utilize splash lubrication for moving a lubrication fluid within the non-pressurized accessory gearbox housing; and
      wherein a pressurized oil line for each of non-pressurized accessory gearboxes is excluded.

11. The aircraft of claim 10, wherein each of the two non-pressurized accessory gearboxes is connected to the main rotor gearbox via a shaft.

12. The aircraft of claim 10, wherein at least one of the one or more gears, the input rotating member, or the first output member is lubricated within each non-pressurized accessory gearbox housing.

13. The aircraft of claim 10, wherein the one or more output rotating members are configured to drive the blower, the hydraulic pump, and the electrical generator.

14. The aircraft of claim 10, wherein each non-pressurized accessory gearbox housing further comprises an oil level gauge in fluid communication with the lubrication fluid and positioned to provide an indicium of a level of the lubrication fluid in the non-pressurized accessory gearbox housing when the non-pressurized accessory gearbox is not in operation.

15. The aircraft of claim 10, further comprising an oil level sensor that measures a level of a lubrication fluid in the non-pressurized accessory gearbox housing.

16. The aircraft of claim 10, wherein at least one of the one or more gears is a drive gear that includes two of the output rotating members, wherein a first output rotating member of the two output rotating members is a first portion of the drive gear facing in a first direction, and a second output rotating member of the two output rotating members is a second portion facing in a second direction that is opposite to the first direction.

17. The aircraft of claim 16, wherein the drive gear is configured to drive the blower and the electrical generator.

18. A method of providing redundant accessory functions to a rotorcraft comprising:
    providing a main rotor gearbox;
    connecting two non-pressurized accessory gearboxes to the main rotor gearbox, each of the non-pressurized accessory gearboxes comprising:
        a non-pressurized accessory gearbox housing;
        one or more gears disposed within the non-pressurized accessory gearbox housing;
        a lubrication fluid within the non-pressurized accessory gearbox housing;
        one or more output rotating members in communication with the one or more gears wherein the one or more output rotating members are configured to be connected to two or more outputs for a blower, a hydraulic pump, or an electrical generator;
        an input rotating member configured to receive input from the main rotor gearbox via a shaft, wherein the input rotating member is connected to the one or more gears in the non-pressurized accessory gearbox housing;
        wherein a pressurized oil line for each of the non-pressurized accessory gearboxes is excluded; and
    moving the lubrication fluid within each non-pressurized accessory gearbox housing using splash lubrication.

19. The method of claim 18, wherein at least one of the one or more gears is a drive gear that includes two of the output rotating members, wherein a first output rotating member of the two output rotating members is a first portion of the drive gear facing in a first direction, and a second output rotating member of the two output rotating members is a second portion facing in a second direction that is opposite to the first direction.

20. The method of claim 18, wherein the drive gear is configured to drive the blower and the electrical generator.

21. The method of claim 18, wherein each of the two non-pressurized accessory gearboxes is connected to the main rotor gearbox via a shaft.

22. The method of claim 18, wherein at least one of the one or more gears, the input rotating member, or at least one of the one or more output rotating members is lubricated within the non-pressurized accessory gearbox housing.

23. The method of claim 18, further comprising providing an indicium of a level of the lubrication fluid in each non-pressurized accessory gearbox housing when the each non-pressurized accessory gearbox is not in operation using an oil level gauge in fluid communication with a lubrication fluid.

24. The method of claim 18, further comprising measuring a level of the lubrication fluid in the non-pressurized accessory gearbox housing using an oil level sensor.

25. The method of claim 18, wherein an external oil cooler for each of the non-pressurized accessory gearboxes is excluded.

26. The method of claim 18, wherein external grease-packed bearings for each of the non-pressurized accessory gearboxes are excluded.

27. A method of lubricating a non-pressurized accessory gearbox comprising:
    providing a lubrication fluid in a non-pressurized accessory gearbox housing comprising one or more gears;
    providing an input rotating member configured to receive input from a main rotor gearbox via a shaft connected to the one or more gears;
    providing one or more output rotating members connected to the one or more gears wherein the one or more output rotating members are configured to be connected to two or more outputs for a blower, a hydraulic pump, or an electrical generator; and
    moving the lubrication fluid within the non-pressurized accessory gearbox housing using splash lubrication, and wherein the non-pressurized accessory gearbox is connected to the main rotor gearbox;
    wherein providing a pressurized oil line for the non-pressurized accessory gearbox is excluded.

* * * * *